Figure 1:
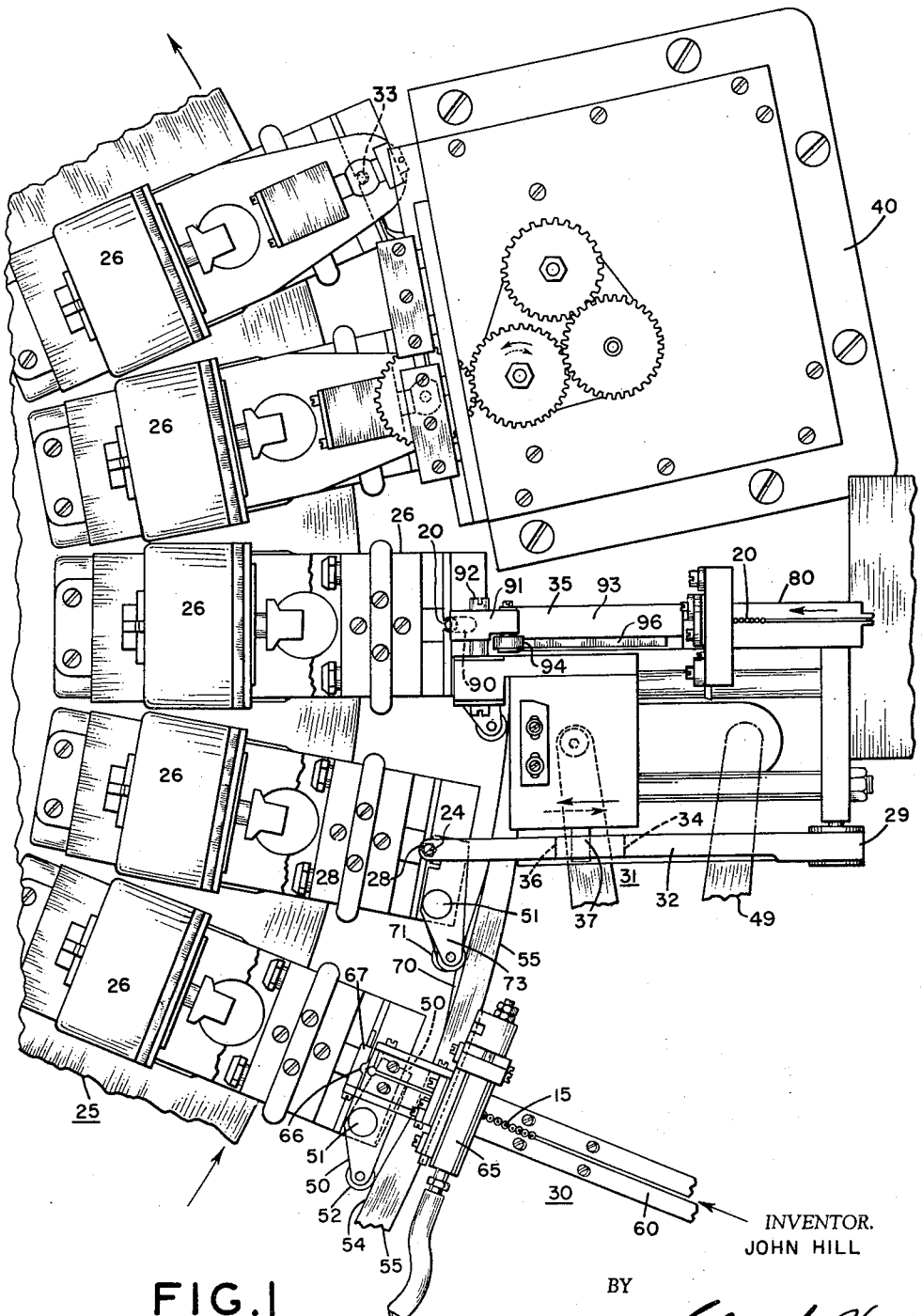

March 20, 1962     J. HILL     3,025,978
TURNOVER MECHANISM

Filed Dec. 18, 1959     2 Sheets-Sheet 1

INVENTOR.
JOHN HILL
BY
*Eber J. Hyde*
ATTORNEY

March 20, 1962 — J. HILL — 3,025,978
TURNOVER MECHANISM
Filed Dec. 18, 1959 — 2 Sheets-Sheet 2

INVENTOR.
JOHN HILL
BY
ATTORNEY

United States Patent Office 3,025,978
Patented Mar. 20, 1962

3,025,978
TURNOVER MECHANISM
John Hill, Malden, Mass., assignor to Clevite Corporation, Cleveland, Ohio, a corporation of Ohio
Filed Dec. 18, 1959, Ser. No. 860,528
5 Claims. (Cl. 214—1)

This invention pertains to hand-off and turnover apparatus used in a machine for assembling two sub-assemblies into a finished product, and more particularly used in a machine for assembling two very small sub-assemblies in a very precise manner to form a semi-conductor device such as a diode.

The diode made by apparatus of which the present invention is a portion is comprised of a first sub-assembly formed of a glass tube or cup within which there is mounted on a lead wire a semiconductive wafer of germanium or silicon or the like, the lead wire being sealed through the enclosed base of the glass tube or cup; and a second sub-assembly comprised of a glass bead through which there is sealed a second lead wire and on one end of this lead wire there is a cat whisker of gold wire, or the like.

The problem solved by the apparatus of which the device of the present invention is a portion is to automatically and very rapidly and accurately bring together the two sub-assemblies so that the cat whisker engages the semiconductive wafer with a given, very critical, amount of pressure, whereupon the whisker is welded or alloyed to the wafer and the glass bead is fused in the open end of the glass tube or cup to completely enclose the cat whisker and the wafer in a sealed glass enclosure. One of the critical series of steps involves picking up the second sub-assembly, quickly turning it over and delivering it to another device which holds it with the gold wire extending downwardly.

The semi-conductive diode is very small, the glass enclosure being about ¼" long and only about .095"±.002" in diameter; the semi-conductive wafer is only about .002" thick and the gold wire is 2 mil. During assembly the cat whisker engages the wafer with a positional relationship accurate to about one half of a tenth of a thousandth (.00005"), and the glass bead must fit very closely within the open end of the glass tube so that the two can be fused together. In spite of this very high degree of dimensional accuracy the two sub-assemblies must be very quickly assembled in order for the final product to economically compete for sales in industry. Thus it becomes essential that automatic machinery be provided which is rapid and highly accurate.

The automatic machinery must position the glass bead within the glass tube prior to fusing the two parts together, because if the parts are misaligned sideways the finished product will have a relatively thick glass wall to one side and will have a relatively thin glass wall to the opposite side. Also, the side walls of the enclosure will not be straight. In spite of an annealing cycle to which each assembled diode is exposed, those diodes which have misaligned tubes and beads have a very high failure rate when they are subjected to a rigorous temperature cycling and vibration or shock test. The failure is due to unannealed stresses in the thick-thin glass portions, also, if the glass bead extends too far into the glass tube, or does not extend far enough into the tube at the time of fusing, high rejection rate of the finished product is experienced. It will be seen therefore, that two very small sub-assemblies must be electrically and mechanically connected together with a very high degree of accuracy.

It is an object of the present invention to provide automatic machinery for and a method of assembling semi-conductor diodes.

Still another object of the present invention is to provide a device and system for quickly, yet very accurately, positioning a cat whisker with respect to a semi-conductive wafer.

Another object of the invention is to provide mechanism for quickly, yet very gently, turning a very delicate sub-assembly end-for-end.

Still another object of the invention is to provide mechanism for quickly, yet very gently, taking a delicate sub-assembly from a feed device and handing it to an assembly device.

Still another object of the invention is to provide a quick acting end-for-end reversal mechanism which simultaneously takes a delicate device from one station and hands it off to another station.

For a better understanding of the present invention, together with other and further objects thereof, reference is had to the following description taken in connection with the accompanying drawings, and its scope will be pointed out in the appended claims.

Figure 2:
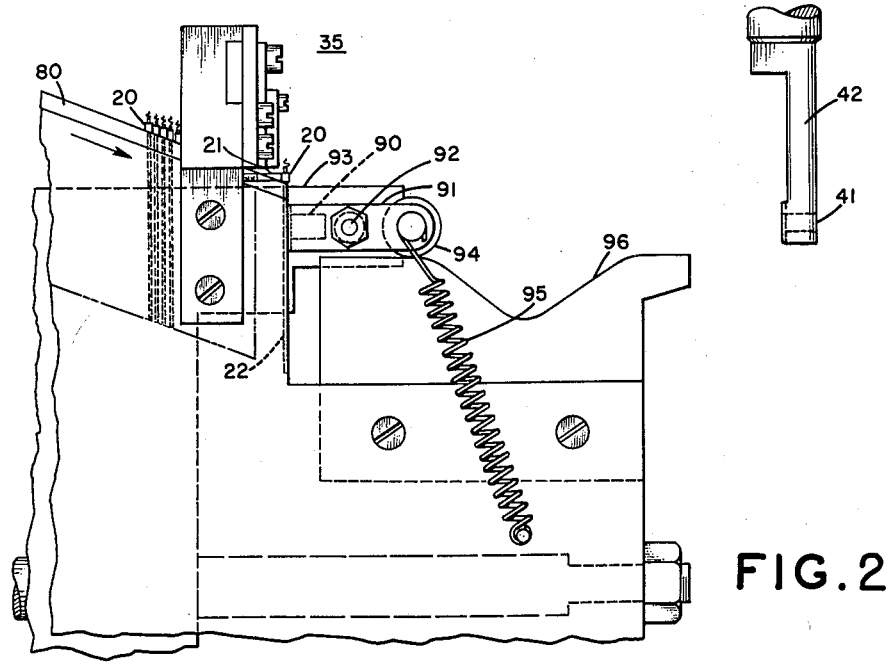
Figure 3:
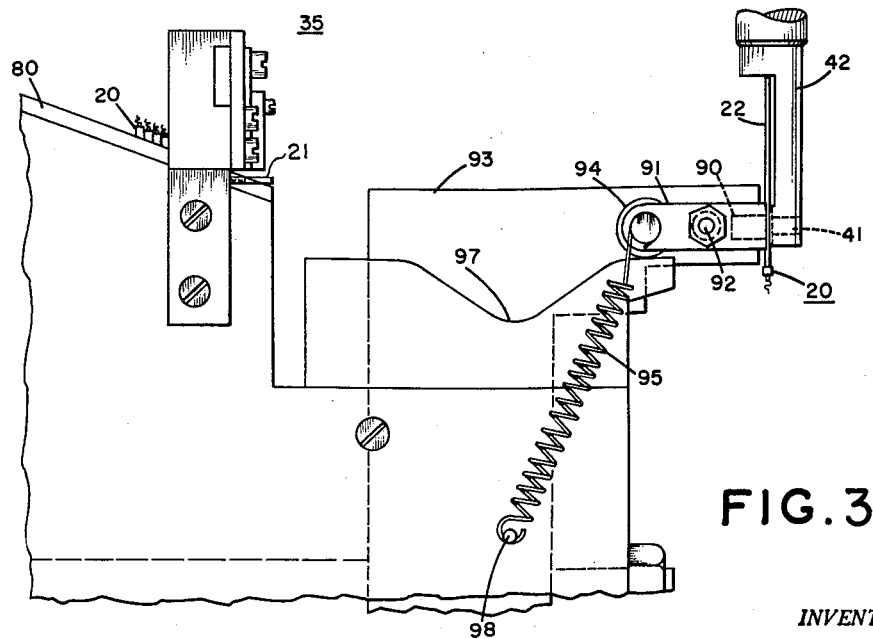

With reference to the several sheets of drawing:

FIGURE 1 is a plan view of a portion of a rotary turret-type of turn table for automatically connecting together two sub-assemblies, showing at one station the turnover mechanism of the invention; and FIGURES 2 and 3 are side views showing details of the mechanism for feeding anode sub-assemblies to the turntable in indexed and oriented relation to the first sub-assembly.

An aspect of the invention lies in the provision of a mechanism for turning over an article, which includes a cam block having a cam face thereon. A transfer block is mounted adjacent the cam block for relative linear motion therebetween. Means are connected to at least one of the blocks to effect the relative linear motion between the cam block and the transfer block. A turnover arm has a bearing such as a roller or the like connected to one end thereof and has article handling means connected to its other end. The turnover arm is pivotally connected to the transfer block at a location between the bearing and the article handling means. Spring means are connected to the bearing means (or to the end of the turnover arm at a location near the bearing) and bias the bearing means against the cam face. There is a relationship between the length of that portion of the turnover arm which lies between the pivot point and the bearing and the slope of the cam face. The relationship is such that the pivot point moves on a straight line. Also, the relationship is such that when the bearing reaches the bottom of the cam face the movement of the bearing means, in effect, is no longer controlled by contact between the bearing means and the cam face.

Another aspect of the invention lies in the provision of an article handoff mechanism wherein there is an article receiving station and an article feeding station spaced therefrom. Transfer arm means are mounted to move back and forth between the two stations, and to take an article from the feeding station and hand it to the receiving station. The transfer arm means includes means for gripping the article with a given degree of tenacity. The article feeding station means includes article gripping means which grip the article with a degree of tenacity less than that of the transfer arm means so that as the arm means approaches and leaves the feeding station it takes an article away with it. The receiving station means has an article gripping device whose grip is greater than that of the transfer arm so that as the arm holding the article approaches the receiving station and then goes back toward the supply station it leaves the article with the receiving station. The gripping mechanisms may be made of magnets or they may be pneumatic or the like.

FIGURE 1 shows a plan view of the apparatus for assembling two diode sub-assemblies 15, 20, one of which has a glass bead and the other of which has a glass tube. The apparatus comprises a rotatable turret or table 25 which carries with it a large number of holders 26 for rotation past a succession of stationary work stations mounted around the periphery of the work table 25. The table 25 makes a complete rotation in steps, with a total of 45 seconds of motion and a total of 2 minutes and 15 seconds of stationary or work time.

FIGURE 1 is a plan view showing a portion of the work table 25 and a plurality of holders 26. As each work holder 26 passes the first work station 30 a glass tube sub-assembly 15 (first seal) is roughly positioned in the work holder 26. The work table 25 rotates the loaded work holder 26 to the next work station 31 where a positioning arm 32 gently pushes the glass tube sub-assembly 15 inside a heater coil 33, using the top surface of the heater coil as an index stop to obtain a high degree of positional accuracy between the first seal and the heater. Thereafter the work table rotates the accurately positioned glass tube sub-assembly to the third work station 35 where a cat whisker sub-assembly 20, or "second seal," is handed from a supply station 80 to the work station or holder 26 by the mechanism shown in detail in FIGURES 2 and 3. Thereafter the work table moves the roughly positioned two sub-assemblies 15, 20 to the fourth or fine positioning work station 40, where the two sub-assemblies are carefully, yet quickly, adjusted into contact with each other, and a timer circuit is made which, at the proper instant, alloys the cat whisker to the semi-conductive wafer. Thereafter the heater coil 33 is energized to fuse the glass bead within the glass tube.

The first work station 30 comprises stationary feeding mechanism outside the periphery of the rotatable work table 25 for feeding to each work holder 26 as it passes one of the "first seal" sub-assemblies 15. The feeding mechanism comprises an inclined track 60 which holds a plurality of the "first seals" 15, and which feeds them one at a time down a chute 64, through an aligning and feeding element 65, through the heater coil 33, through a V opening 66 in an accurately positioned plate 67, to cause the lead wire connected to the glass cup to engage a magnet set in an anvil which is located under the heater 33 only at this work station 30. The work table is stationary while the first seal 15 drops into place, and thereafter the work table rotates to index the loaded work holder 26 to the second work station 31.

As the loaded work holder 26 moves from station 30 to station 31 a clamping jaw 50 clamps on the lead wire 17 of the sub-assembly, and thereafter the lead wire 17 slides laterally off the anvil so that the sub-assembly is supported by the clamping jaw. The clamping jaw is actuated by an upper cam follower device or roller 52 connected to the jaw 50 which is mounted by pivot 51 to the rotatable work table 25. A spring, not shown, biases the jaw shut, and the position of the cam follower 52 against raised portions 54 of a stationary cam track 55 overcomes the spring bias and forces open the jaw to permit entry of the sub-assembly between the clamping jaw and the V plate 67. At this point in the rotation of the loaded work holder 26 of the jaw 50 is closed securely on the first seal assembly 15.

As the loaded work holder moves to the second work station 31 the clamping action of the jaw 50 is relieved slightly by the action of the cam follower 52 on the stationary cam track 55.

At the second work station 31 a positoning arm 32 pushes the loosely held sub-assembly 15 further down into proper location in respect to the heater coil 33, using the top surface of the heater coil as a reference. The positioning arm 32 is pivotably mounted at 29 to permit up and down pivoting motion of the other end of the arm. The underneath surface of the arm 32 is a cam face, having a high area 34 and a low area 36.

A roller 37 moves back and forth between the high and low cam areas 34, 36 in timed relation to the motion of the table 25, thereby raising and lowering the arm 32 at the proper instants to permit motion of the table and to press down on the loosely positioned first sub-assembly when the work table is stationary.

The end of the arm 32 which engages the first seal 15 to position it, has an engaging portion 28 which touches the first seal 15 during positioning. A portion of the arm engages the top edge of the heater coil 33 thereby to limit the downward motion of arm 32. The position of the engaging portion 28 can be adjusted by the threaded member 24 in respect to the collar, thereby to accurately adjust the machine so that the top edge of the glass portion of the first seal is very accurately positioned in regard to the heater coil 33. It will be seen with this construction that the heater coil itself is the reference surface for the positioning of the first seal 15, and that the downward travel of the arm 32 is terminated by the coil 33. It is of great importance that the position of the glass tube 16 within the coil 33 be exact. Otherwise a bad seal is obtained when the glass bead 21 is fused to the tube 16. If the first seal 15 is too low in the heater the glass bead 21 will be too high in respect thereto, and an "underseal" is obtained. An "underseal" is not hermetic and causes rejection of the unit during inspection. If the first seal device 15 is positioned too high in the heater, distortion of the glass body case 16 is obtained during the final fusing operation and again the unit must be rejected. Prior to adopting this positioning system approximately 14% of the production had to be rejected for the above noted two flaws. At the present time with the new method, rejects on some machines run as low as 1% and none of the machines higher than 3%.

After the arm 32 accurately positions the first seal 15 the cam track 55 permits the spring to actuate the jaw 50 to clamp the glass portion 16 in the notch 66 in the V plate 67, thereby to very accurately position and hold the glass tube laterally as well as in height.

Thereafter the accurately located sub-assembly 15 moves on to the third work station 35 where the second seal device 20 is quickly indexed into positional relationship to the first seal 15.

FIGURES 2 and 3 show in detail the mechanism which is the subject of the present invention. The anode sub-assemblies 20 are arranged in a stationary slide 80 down which they progress toward the rotating work holders 26.

As each work holder 26 moves into position at the third work station 35 an anode (second seal 20) sub-assembly holder 42 which includes a magnet member 41 is being pushed downwardly by a roller, not shown, which is in engagement with the underneath surface of the stationary cam, not shown, and simultaneously the feed mechanism shown in FIGURES 2 and 3 pick up one anode sub-assembly 20 from the slide 80, taking it away from the slide and the holder device 21, turn it end-for-end, and place the magnetizable wire 22 of the sub-assembly 20 against the magnet 41 which is part of the holder 42. The feed mechanism then returns to its original position, ready to feed the next sub-assembly 20 to the next work holder 26 as it passes.

The feed mechanism is driven in synchronism with the rotation of the turret 25, and includes a transfer magnet 90 held by transfer arm 91 which is pivoted at 92 to a reciprocating arm 93. An arm 49 drives the reciprocating arm 93 in synchronism with the rotation of the turret. The end of the transfer arm 91 opposite the magnet 90 carries a cam follower wheel 94, and a spring 95 holds the cam follower wheel 94 against a cam face 96. As shown in FIGURE 2 the magnet 90 picks up the anode sub-assembly 20 by its wire 22, then as the reciprocating arm 93 is moved to the right the cam follower wheel 94 runs down the cam face 96, the spring 95 holding it against the cam face. When the cam follower wheel 94 reaches the bottom of the cam 96 the transfer arm 91 is in a vertical position and as the wheel 94 moves up the right-hand cam slope the anode sub-assembly 20 is reversed and is presented to the magnet 41. It is essential that the effective strength of the magnet 41 on the wire be greater than the effective strength of the magnet 90 on the wire so that the sub-assembly 20 is held by the magnet 41 as the transfer mechanism moves back to its original position.

In order to achieve the reversal of the arm 91 as it moves from the position shown in FIGURE 2 to the position shown in FIGURE 3, it is essential that the roller 94 be held against the cam face 96 by spring 95 except when the roller reaches the very bottom 97 of the cam face. At this location there should be a slight clearance on the order of .005 to .010″ between the cam face 97 and the roller 94, the transfer arm 91 holding the roller away from the cam face. The spring 95 is connected to the reciprocating arm 93 at location 98 which is directly under the lowest point 97 of the cam face. Thus, because of the slight clearance between the roller and the cam face, and because of the spring location a slight "snap action" is imparted to the arm 91 to cause it to mount the cam face 96 with the arm 91 reversed. This "snap action" does not jar the delicate anode sub-assembly 20 because the clearance between the roller and the cam face is so slight that the roller hardly leaves contact with the cam face.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A turnover mechanism for turning over an article comprising, in combination; a cam block having a cam face thereon, a transfer block mounted adjacent said cam block for relative linear motion therebetween, means connected to one of said blocks for effecting relative linear motion between said cam block and said transfer block, a turnover arm having a bearing means at one end thereof and article handling means at the other end thereof, means pivotably connecting said turnover arm to said transfer block at a location between said bearing means and said article handling means, spring means biasing the bearing means against the said cam face, the length of the turnover arm between the pivot point and the bearing means and the slope of the cam face being such that as the bearing means moves along the cam face the pivot moves along a straight line, the bottom of the cam face being sufficiently deep that when the bearing means reaches the lowest point on the cam face the spring means no longer biases the bearing means against the cam face.

2. A turnover mechanism as set forth in claim 1, further characterized by said spring means being a tension spring connected to said bearing means and also connected to said cam block at a location directly below the lowest point of said cam face.

3. A turnover mechanism as set forth in claim 2, further characterized by said bearing means comprising a roller mounted on said turnover arm.

4. An article hand-off and turnover mechanism comprising, in combination; an article receiving station means, an article feeding station means spaced from said receiving station means and adapted to have a supply of articles to be furnished in reverse orientation to said spaced receiving station means, transfer means mounted to move back and forth between said feeding station and said receiving station including a transfer block and a turnover arm having bearing means at one end thereof and article handling means at the other end thereof, means pivotably connecting said turnover arm to said transfer block at a location between said bearing means and said article handling means, a cam block having a cam face thereon mounted adjacent the path of travel of said transfer arm and adapted to have the said bearing means in engagement with said cam face, spring means biasing the bearing means against the said cam face, the length of the turnover arm between the pivot point and the bearing means and the slope of the cam face being such that as the bearing means moves along the cam face the pivot moves along a straight line, the bottom of the cam face being sufficiently deep that when the bearing means reaches the lowest point on the cam face the spring means no longer biases the bearing means against the cam face, first article holding means forming a portion of said turnover arm means and adapted to hold said article with a given degree of tenacity, second article holding means forming a portion of said article feeding station means and holding said article with a degree of tenacity less than said given degree so that said turnover arm means can take the article away from said article feeding station means as said turnover arm means approaches said feeding station means, third article holding means forming a portion of said article receiving station means and adapted to hold said article with a tenacity greater than said given degree so that said article receiving station means can take the article away from said turnover arm means as said turnover arm means approaches said article receiving station means.

5. An article hand-off and turnover mechanism comprising, in combination; an article receiving station means, an article feeding station means spaced from said receiving station and adapted to have a supply of articles to be furnished to said spaced receiving station means, a cam block having a cam face thereon, transfer arm means mounted adjacent said cam block for relative motion therewith back and forth between said feeding station means and said receiving station means, a turnover arm having a bearing means at one end thereof and article handling means at the other end thereof adapted to hold said article with a given degree of tenacity, means pivotally connecting said turnover arm to said transfer arm means at a location between said bearing means and said article handling means, spring means biasing the bearing means against the said cam face, the length of the turnover arm between the pivot point and the bearing means and the slope of the cam face being such that as the bearing means moves along the cam face the pivot moves along a straight line, the bottom of the cam face being sufficiently deep that when the bearing means reaches its lowest point relative to said cam face the spring means no longer biases the bearing means against the cam face, second article holding means forming a portion of said article feeding station means and holding said article with a degree of tenacity less than said given degree so that said transfer arm means can take the article away from said article feeding station means as said transfer arm means and said turnover means approach said feeding station means, third article holding means forming a portion of said article receiving station means and adapted to hold said article with a tenacity greater than said given degree so that said article receiving station means can take the article away from said article handling means as said article handling means approaches said article receiving station means.

References Cited in the file of this patent

UNITED STATES PATENTS

| | | |
|---|---|---|
| 1,627,989 | Nilson | May 10, 1927 |
| 2,832,478 | Malewicz | Apr. 29, 1958 |
| 2,868,240 | Roeber | Jan. 13, 1959 |
| 2,913,130 | Kuba | Nov. 17, 1959 |
| 2,940,584 | Kunz | June 14, 1960 |